United States Patent
Liu (10) Patent No.: US 10,142,180 B2
(45) Date of Patent: Nov. 27, 2018

(54) METHOD AND SYSTEM FOR PROVIDING UNIFIED CONFIGURATION INFORMATION TO DISPARATE SYSTEM SOFTWARE COMPONENTS

(71) Applicant: Edgewater Networks, Inc., San Jose, CA (US)

(72) Inventor: Kim Quo-Taht Liu, Santa Clara, CA (US)

(73) Assignee: Edgewater Networks, Inc., San Jose, CA (US)

(*) Notice: Subject to any disclaimer, the term of this patent is extended or adjusted under 35 U.S.C. 154(b) by 224 days.

(21) Appl. No.: 14/606,934

(22) Filed: Jan. 27, 2015

(65) Prior Publication Data

US 2016/0149761 A1 May 26, 2016

Related U.S. Application Data

(60) Provisional application No. 62/085,084, filed on Nov. 26, 2014.

(51) Int. Cl.
  *G06F 15/16* (2006.01)
  *H04L 12/24* (2006.01)
(52) U.S. Cl.
  CPC ...... *H04L 41/0843* (2013.01); *H04L 41/0886* (2013.01); *H04L 41/0889* (2013.01)

(58) Field of Classification Search
  CPC .. H04L 41/0889; H04L 41/0886; H04L 67/34
  USPC .................................................. 709/220–222
  See application file for complete search history.

(56) References Cited

U.S. PATENT DOCUMENTS

| | | | | |
|---|---|---|---|---|
| 8,583,769 B1* | 11/2013 | Peters | .................... | G06F 9/541 709/221 |
| 9,021,010 B1* | 4/2015 | Das | .................... | H04L 41/0813 709/201 |
| 2008/0320441 A1* | 12/2008 | Ahadian | ................... | G06F 8/24 717/108 |
| 2010/0058330 A1* | 3/2010 | DeHaan | .................... | G06F 8/60 717/177 |
| 2011/0016298 A1* | 1/2011 | McCollom | .............. | G06F 21/57 713/1 |
| 2013/0031245 A1* | 1/2013 | Subramanian | ...... | G06F 11/3006 709/224 |
| 2015/0100600 A1* | 4/2015 | McGee | ............... | G06F 9/44505 707/770 |
| 2015/0378685 A1* | 12/2015 | Kaplinger | ............... | H04L 67/02 717/104 |

* cited by examiner

*Primary Examiner* — Hieu T Hoang
(74) *Attorney, Agent, or Firm* — Brooks, Cameron & Huebsch, PLLC (57) ABSTRACT

Techniques for maintaining configuration data for software components deployed on a computer network are disclosed. The techniques include a server on the computer network receiving configuration data values associated with the software components, committing the configuration data values to a data store, creating, from configuration data stored in the data store, configuration files for the software components with the configuration data value, and providing the configuration files to the software components.

19 Claims, 7 Drawing Sheets

METHOD AND SYSTEM FOR PROVIDING UNIFIED CONFIGURATION INFORMATION TO DISPARATE SYSTEM SOFTWARE COMPONENTS

RELATED APPLICATIONS

The present application claims the benefit of U.S. Provisional Application Ser. No. 62/085,084, filed Nov. 26, 2014, which is expressly incorporated herein in its entirety.

BACKGROUND INFORMATION

Field of the Disclosure

The present invention relates to control of computer equipment and managing data within a computer system. An example provides for management of configuration settings for different software components within a computer system through creation of a configuration management system including a centralized configuration data store and a template system which receives configuration data from the configuration data store and applied configuration data to different software components in the computer system.

Background

Many organizations such as businesses rely on computer networks. Business computer networks may frequently include multiple different pieces of software. For example, a computer may provide different software from different vendors to provide database support, accounting, sales and inventory control, internet support, etc. As network/internet communications bandwidth has increased in companies, the number of different software packages being used has also increased. This provides end users with rich content in documents, media, webpages, etc. and provides a better experience for those using the computer system. As computer networks use increased numbers of software components, it becomes increasingly difficult to manage the software components and to ensure that software components are all updated properly and configured properly to function together within the computer system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how vendors may manage configuration settings within multiple software components on a computer system. Particularly, the present disclosure describes how a vendor may provide unified configuration settings to software components to ensure that software components are updated as desired and to ensure that any system interruptions do not affect software configuration updates and cause problems within the system.

Applicants have developed computer systems which include multiple different subcomponents and subsystems. Particularly, the systems may involve different software components. One challenge in implementing such a system is in providing uniform configuration information to various different software components. Frequently, each software component will require particular configuration data presented in a particular configuration file or format. Failure of a software component to properly update a configuration file can result in that software component operating on a different configuration setting than the rest of the system. If a software component operates on a different configuration setting than the rest of the system, the system may develop data errors, consistency problems, or instability. Applicants have observed problems with updating configuration settings in situations such as where there are power interruptions during an update, where a piece of software is unavailable or busy while an update is performed.

Many of these systems involve different software components which are provided from different third parties. In this situation, there is little ability to change how each software component receives configuration settings and it is necessary to change how the system provides configuration settings to the software components to avoid problems in the software configuration settings.

The present system allows for changing configuration settings across all components and across all data and configuration formats. The system changes may, to the extent is physically possible, happen across all components of the system simultaneously. The system may be used to avoid a situation where settings are changed in one file or software component and implemented in one system component before the rest of the system is updated. All parts of the system may be updated at the same time.

Figure 1:
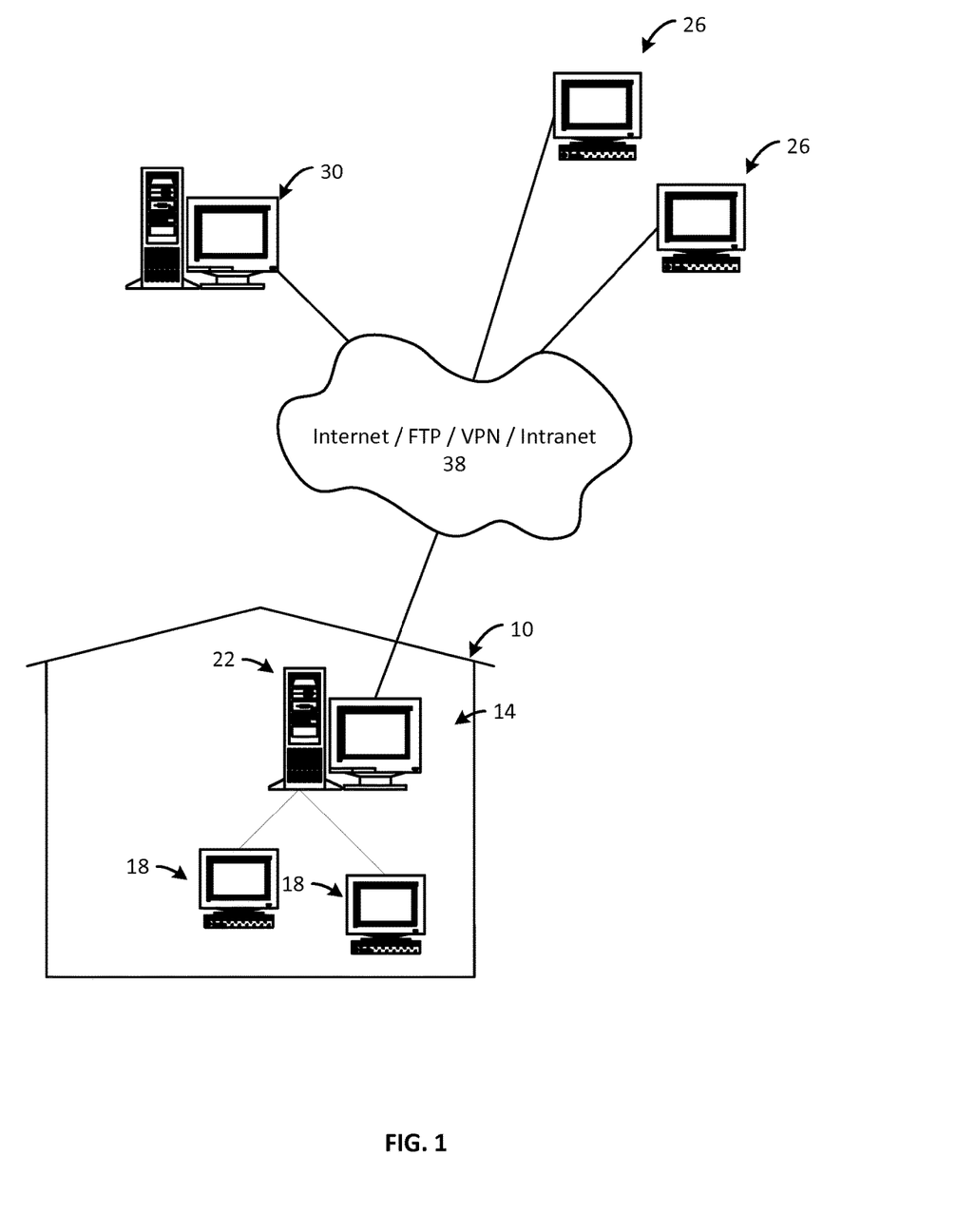
FIG. 1 is a schematic illustrating various aspects of a computer system according to the present disclosure.

Referring to FIG. 1, an organization 10 may operate a computer network 14. The organization may be a private entity, business, educational institution, government institution, etc. Additionally, users, or third party users are discussed herein. Users may be persons/computers that access the network 14 or otherwise communicate with the network to provide, transmit, or receive data. Users may access software components which are operated on/by the network 14. Thus, in one example a system may include a network 14 and users who access software, data, and services on the network 14.

The computer network 14 may include user computers such as workstations 18, and may also include a server 22. It will be appreciated that the tasks implemented by the server 22 may be implemented by multiple servers. Computers within the computer network 14 may communicate with each other via a network such as a local area network. Computers within the computer network may also interact with outside computers such as external user computers 26 or external servers 30 via the internet 38. External user computers 26 may be clients of the organization 10 and may access services provided by the organization. External servers 30 may also be clients of the organization 10 and may provide data and services to the organization. It is appreciated that the various computers typically communicate with other computers via network devices such as routers, switches, modems, etc.

As discussed, the computer server 22 includes multiple software components and provides access and services to user computers. In one example, each software component may be a software program such as a database program, an accounting program, media editing software, design software, sales and inventory software, etc. Different users may use one or more of the software components. The different software components are typically from different providing companies. As such, the different software components frequently each have different file types, interfaces, settings, configuration, etc.

Figure 2:
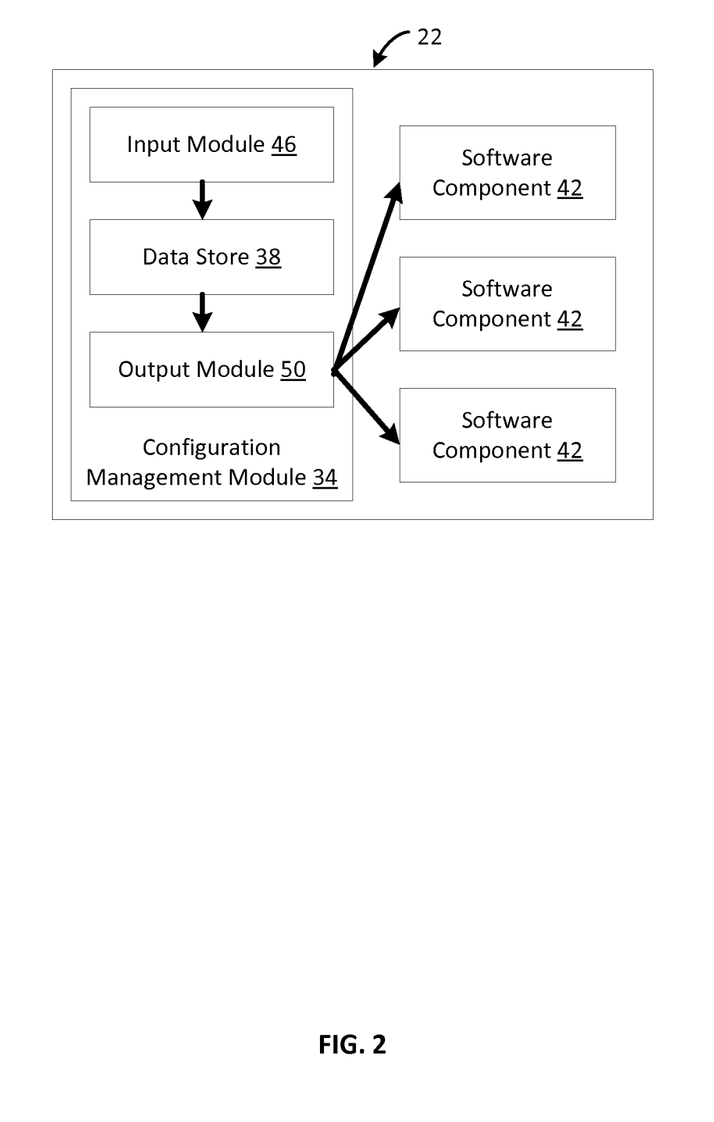
FIGS. 2 through 6 are schematics illustrating various aspects of the computer system.

As illustrated in FIG. 2, the server 22 includes a configuration management module 34 which stores configuration values in a single configuration data store 38 (e.g. a database storing configuration settings and data values). The configuration management module 34 may output configuration files from the configuration values in the data store and may provide configuration files to the various software components 42. Thus, a person such as an IT support person may use an input module 46 to enter one or more new configuration settings into the server 22. The configuration management module 34 may receive the configuration settings and write the configuration settings to the data store 38. The configuration management module 34 may then create one or more configuration files associated with the software components 42 and provide these to the software components 42. The software components 42 may then each individually receive the configuration files and incorporate the new configuration settings.

The data store 38 may be operated such that any changes to configuration values in the data store are entirely committed or are entirely not committed to the data store. The data store may be operated such that there is no acceptance of a partial data change within the data store. If a change to configuration settings is submitted to the data store, the data store may receive the computer file containing configuration settings and data and entirely commit that configuration data to the data store. If an error is observed in committing the new configuration data to the data store, the data store may reject the entire configuration data change and use the existing configuration data. In this manner, there is no partial success or partial changes in updating data within the data store.

The back end data store presents configuration data and settings to the various subcomponents of the system (e.g. different pieces of software which operate as part of the system). The configuration management module presents configuration data to the system components in the manner that the individual system components require and with appropriate formatting, such as by creating configuration files for the various software components and saving these configuration files in a desired location on the server 22.

The configuration management module includes a template configuration file for each software component and each template configuration file is created in the proper file format and data format for each software component. Each template configuration file may include configuration data values which, rather than being actual configuration data values, are references to particular configuration values within the data store. When the data store is successfully updated, the configuration management module updates each template for each corresponding piece of software operating within the system by taking configuration data values from the data store and applying these data values to the corresponding locations in each template configuration file and saving the file as a newly created configuration file.

In this manner, the configuration management module fills out the configuration information from the backend data store for each template. The template may identify particular data value identifiers which are used in place of actual configuration data values in particular locations within the template configuration file and the configuration management module may retrieve data values identified in the data store as corresponding to the particular data value identifiers from the template configuration file.

Working backwards from the software components; each software component will have one or more configuration files which are used to provide settings and configuration data for the software component. The configuration management module 34 will have a template configuration file for each software configuration file. Each template configuration file will have configuration data value identifiers in place of actual configuration data values. The data store will have a database of actual configuration values; each one associated with a data value identifier corresponding to the data value identifiers used in the template configuration files. As updating the data store is handled to require either complete success in updating data values or rejection of the update, the data store is complete and has valid data for each configuration data value. Thus, an update to the data store is required to be completely successful or the update is rejected. After any update, the data store has a complete set of configuration data values and the configuration management module may create configuration files from the template configuration files and be successful in creating each necessary configuration file for the various software components.

The configuration management module can look at what user/program/process is requesting the file and, based on the information about who is opening the file, we can serve all or parts of the configuration file/information, such as within a configuration file created from a configuration template and data values from the data store.

A change in the back end data store is implemented in each template at each time since the templates each take their values from the data store. Any update to the system happens completely and, in many instances, instantly since the data store update is all or nothing and then each configuration template is created from data store data. If the system restarts, each software component draws configuration settings from the configuration files, with each configuration file being created from a corresponding template configuration file with current values from the data store. The system operates with a single data store with data presented to each third party software components in the manner they each desire through templates which draw from the data store. In this manner, any configuration settings to the system are committed to the data store in a singular update. At this point, the configuration settings for the entire system are updated and held in the data store. Any system interruption during a data store update will cause the update to be rejected in its entirety and the system will operate unchanged from before the update. The update can then be recommitted to the data store after the system interruption and the system configuration will be updated accordingly. Any system interruption after committing an update to the data store will not adversely affect the system configuration or the configuration update. As the system resumes operation from the interruption, each software component may draw new configuration data from the data store/configuration management module as discussed and resume operation with the updated configuration settings.

The configuration management module allows for greater control over what changes may be made to system configuration and files. In a traditional system, if a user can edit a file, they can edit any part of the file and may be able to undesirably retrieve data from the file since, in a normal file system, if a user can read a file they can read all parts of the file.

The configuration management module allows for segregation at the data level. Since the data store isolates the entry of configuration data from the configuration file, the configuration management module can isolate the entry of configuration data at the data store. Configuration data can be managed individually and the input method into the data store can be limited. Any user can easily be limited to only changing particular predefined data values including being authorized to edit only one data element, if desired, by assigning restrictions or categorizations to individual data elements and assigning corresponding authorizations to users who may access the data store. Each piece of data can be given specific permissions to particular users. If a user can only change a limited number of data elements pertaining a configuration file, there is much additional access control and permissions control of the system and configuration data and the changes to the system. Data or configuration file viewing or editing can be limited according to the user.

In one example, the input module 46 may present simulated configuration files to a user who is entering configuration data values into the system. A simulated configuration file may represent a configuration file associated with a software component, a group of software components, one or more persons or computers who access software components on the server, etc. The user may enter configuration data values into the simulated configuration file as if changing the configuration of the software component itself. The configuration management module 34 may take any changes in configuration data values and record these values in the data store 38, ensuring that the data values and the process of writing the data values to the data store meet atomicity, consistency, isolation, and durability objectives. The configuration management module 34 may then create new configuration files from the entire set of configuration data in the data store and the software components may each adopt the new configuration data. For example, an output module 50 may store template configuration files which include configuration data value identifiers. The output module 50 may open a template configuration file, identify configuration data value identifiers in the template configuration file, identify corresponding configuration data values in the data store, replace the configuration data value identifiers with the configuration data values to create a configuration file from the template configuration file, and save the configuration file on the server 22 at an appropriate location for use by a software component 42.

Software or system configuration data may be viewed as information or data which is interpreted or used as information describing the arrangement, availability, constraints, performance, and/or provisioning of resources, components, policies (including but not necessarily security policies), and initial and/or default data. Configuration Information may be used for describing what hardware resources are available to be used by a given software component (i.e. such as, but not limited to, available memory, maximum allowed memory usage, available storage space, network address and/or access information, etc.), software resources (i.e. locations and methods of access of other software components, which formats to use, etc.), and operational information (i.e. such as but not limited to passwords/authentication information, access policies, default data, which (human) language(s) to use for user interaction, location and/or methods to access data to be processed, error handling policies, etc.)

For some software components, there may be significant overlap between configuration information and the data the software component is intended to process. In some cases, the sets of configuration information and data may be completely independent, one may be a subset of the other (in either arrangement), or the two sets may be identical.

A software component or software entity may refer to logical grouping(s) of software functionality and may frequently refer to a piece of software created by a third party or developed independently from other software components on the system 14. Example software components may include accounting software, database software, etc. and may also include smaller software components such as plugins or modules such as a flash player, document or media viewer, etc. A software component may contain one, or more other software components. The exact delineation of a given software component may depend on application/use and/or configuration information and may vary over time, as how a software component is configured may (in part or in whole) define the functionality provided by the software component. Additionally, configuration information or processed data might change the composition of a software component by, as an example, causing additional and/or specific secondary software components to be invoked or added. For example, based on configuration information governing which (human) language to present to a user for user interaction, a given software component might load or activate secondary software components that provide specific functionality for the given language, such as different methods of formatting or displaying the language (left to right vs. right to left vs. top to bottom, etc.).

A file system may be viewed as a management and abstraction layer for storing data. Data may be stored in logical individual, discrete, and named entities referred to as 'files' and reference by name. The (logical) files may be further organized by placing them in (logical) 'directories', which may contain files or other directories. The actual physical storage of the data may be within a single physical storage mechanism (including but not limited to RAM, solid-state drives, magnetic hard drives, optical storage medium, magnetic tape, etc.) or across multiple physical storage mechanisms. In either case the file system provides a logical abstraction for information storage such that the software making use of the file system is not required to be aware of the details of the physical storage mechanisms. One consideration is that with a typical file system, the abstraction of the file system need not alter the data stored within the file system. As part of the implementation of the file system, the data might be transformed in format (such as, but not limited to, being compressed and/or encrypted) for internal storage, but upon retrieval the retrieved data should be identical to what was (last) requested to be stored (with the caveat that if two separate software processes attempt to store data in the same file at the same time, one process might over-write the data of the other.)

The data store may be operated to include ACID semantics (Atomicity, Consistency, Isolation, Durability) to assure that a given data store transaction will be completed atomically or not at all (i.e. there is no partial completion of a data store transaction). This ensures that the state of the data in the data store will be consistent after each transaction, that concurrent or simultaneous transactions on the data store will not violate the other ACID semantics (i.e. each transaction will complete atomically or not at all, that the state of the data store will remain valid, etc.), and that any completed transaction should be stored or committed to storage in a reliable (i.e. durable) manner that will attempt to survive faults such as power outages, software crashes, etc.

A Model-View-Controller software pattern may be used to separate the internal representation of the data and application logic, which is referred to as the Model, from the manner or manners in which the data is presented to the consumer, referred to as the View(s), and from the Controller, which handles input into the MVC pattern and modifies the state of the software accordingly. Depending on the input received by the Controller various actions might be taken such as, but not limited to, the data stored within the Model(s) may be modified, the Models themselves changed, or the Views changed.

SNMP (Simple Network Management Protocol) is a standardized protocol for management of devices connected over Internet Protocol (IP) networks. NETCONF (Network Configuration Protocol) is a standardized protocol for the management of configuration information on network devices. YANG and YIN are data modeling languages used by NETCONF to define the syntax and semantics of configuration information and the operations that may be performed on the configuration information.

Managing and providing a coherent configuration state across a network is difficult where a the network and services provide by the network may involve multiple disparate software components provided by 3rd parties, where software components are not be amiable to modification, and where the different software components have different means and methods of configuration as well as different configuration formats. A given piece of configuration information might have to be replicated in different locations, in different formats, or under different identifiers and making configuration changes to the product such that all configurations are updated together as an atomic transaction is difficult.

Providing a single, unified configuration data store 38, that stores configuration data values for multiple software components which are then presented in the format appropriate to each software component 42 via a simulated file system which can also be updated in atomic transactions after verification that the updated configuration values satisfy any required configuration constraints solves these difficulties. The present system can provide an abstraction layer for configuration information management. By utilizing the MVC pattern, management of the configuration information only needs to be concerned with the data model or API exposed by the controller. Configuration management does not have to be concerned with the distinct views or presentation of the configuration information in a specific configuration file format for a specific software component.

The present configuration management system can provide an abstraction layer for presentation and formatting of configuration information. A template system and/or scripting language can be used to generate the Views presented in the MVC model. This allows the presentation of the configuration information to be customized to support arbitrary third-party software as some software might require, for example, XML formatted configuration information, while other software might want the information in JSON, etc. There are many different configuration file formats in use, and even when the format or syntax used between two different pieces of software are the same (i.e. both use XML), the semantics, naming, organization, and format of a given piece of configuration information (i.e. decimal verses hexadecimal representations of the same configuration information) might differ between the two pieces of software. By providing an abstraction layer (e.g. a template configuration file) that can be customized for each target piece of software, the presentation of configuration data values to the software components can be managed separately from the configuration information itself (e.g. the data store) as well as the manner of entering information into the data store.

The present system can provide enhanced control of configuration information permissions. When configuration files are stored in a standard or typical file system, then permissions governing access to the configuration files for reading and modification are handled by file system permissions and at file-level granularity. If a given configuration file contains multiple pieces of configuration information, a user who has permission to edit the file can edit or see any of the configuration information. The present system allows access to individual configuration information elements to be managed via the Controller (the configuration management module) which can provide finer-grained permission management including permission management of individual configuration data values.

The system can provide enhanced tracking and logging of configuration changes. Configuration information changes can be tracked at the individual configuration information element level rather than at the configuration file level. Advanced logging such as detailing which user and process changed or attempted to change a specific configuration information element, and when the event occurred, may be implemented if desired.

The system can provide enhanced support for storing multiple profiles or instances of configuration information across the system and switching between the different profiles. As the configuration information is stored separately from the presentation, switching between different configuration profiles such as between a 'current running configuration' profile, a 'last known good configuration' profile, or a 'factory default configuration' profile is easier with the present system. Such profile switching should be handled atomically by the configuration data store as a single transaction resulting in multiple configuration files from a single data store version. With a traditional file system approach of configuration file storage, multiple versions of the configuration files would have to be managed on the file system, which may not provide transactional or ACID semantics when applying file system operations to groups of files simultaneously.

The system can provide a configuration change notification system. When configuration information is modified in such a way that it changes the generated views presented to the software consuming the configuration information, then it may be necessary to notify the software components that the configuration change has occurred so that the software may process the updated information. While some software components may automatically detect the change, or periodically check for changes, other software components may need to be signaled or informed to re-process the configuration information and in other cases some software components may have to be restarted to begin operation with the changed configuration. Where modified configuration files are stored in appropriate locations for each software component, a software component will typically incorporate the updated configuration data values upon restart.

The system can avoid changes to third-party software components. The system can support arbitrary third-party software component configuration files via the presentation layer (e.g. the output module 50) and configuration change notification system such that the third party software does not need to be modified to take advantage of the benefits of the proposed system.

The system can support different versions of third-party software components. By creating 'Views' or specific template configuration files for the configuration information appropriate to specific versions of a third-party software package, the same configuration information can still be (re)used even after the third-party software has been changed to a version which might require a new configuration file format or contents. The present system facilitates upgrading and downgrading the versions of third-party software without having to convert between different versions of the configuration file formats.

In a typical situation where an upgrade or downgrade between software versions requires a change in configuration file format or structure that is not supported by the target version (which is more typical in a downgrade scenario), then the original configuration file may need to be parsed to extract the relevant configuration information elements which would then be repackaged in the target configuration file format. In the present system, the configuration information is stored in the configuration data store and only the presentation or View of the template configuration file has to be updated. The alternative is the configuration management system has to be able to not only write the configuration information in the format for each software version, but also has to have the ability to read it. That is, if hypothetically, a piece of software switched from XML to JSON for its configuration file format, then in order to support upgrading and downgrading between the versions, the configuration management system has to be able to read JSON and write XML, and read XML and write JSON. (Note: The complexity grows exponentially with the number of configuration file formats involved. With three formats, A, B, and C, then it may have to support converting A→B, A→C, B→A, B→C, C→A, and C→B, or six cases.) With the present system, the system only needs to know how to write XML and write JSON; complexity grows linearly rather than exponentially with different formats.

In one example, presentation of configuration information is separate from the storage of configuration data values and the presentation can be customized per consumer of configuration information. Different components of the system may have different format requirements for consuming configuration information. The configuration information needs to be presented to each component in a format that each component can consume. In some cases, even though different system components may be asking for the same particular piece of configuration information by the same name, or even same logical value (i.e. such as the system hostname), it is possible that different components receive different information. (In the hostname case, as an example, perhaps the webserver component is told to use the hostname 'www.host.domain.com', but the SMTP/mail server is told to use 'mail.host.comain.com'.)

In another example, when configuration data values are modified in the configuration data store, each configuration file can be simultaneously updated with the new configuration data values. When the user updates configuration information in the configuration data store, and chooses to commit the changes, then every consumer of configuration information should be simultaneously presented with an updated configuration file based on the changes. Individual configuration changes may not necessarily trigger an update of the presentation. It is possible to support a transactional configuration system wherein a series or groups of configuration changes are made, and then either the entire set is committed and all presentations updated, or the set of changes is rolled back. Some system components may have to be notified to reload/re-read their configuration information, restart, or otherwise take additional steps to start using the new presentation of the configuration information. Because of the variety of possible methods, it may not be possible to achieve perfect synchronized configuration updates across all software components, but each software component can update configuration data at the next opportunity and all configuration changes will be implemented regardless of system interruption and other system complexities. Additionally, there may be circumstances where one software component depends on a second component in such a way that the configuration of one component must be updated before the other and a simultaneous update might cause errors. This may also make an exactly synchronized configuration update across all components problematic.

When the presentation of configuration information for a particular component is modified or updates, it is possible to trigger actions in the system based on the updates. It may be necessary to trigger actions based on configuration updates to take such measures as informing a system component that it must reload/re-read configuration information now. A scripting language/system may be used to take the necessary steps. To facilitate the customization of the presentation of configuration information on a per-component basis, the presentation may use a template and/or scripting language to describe the presentation. The presentation need not be hard-coded into the system. For instance, a template configuration file may be used. The user could create a template configuration file for a given software component which includes placeholders (configuration data value identifiers) for a given piece of configuration information which can be added in by the configuration management module. A scripting language could be used such that when the script for a given component was executed, it would generate the appropriate configuration file from the template configuration file and the data store. Both a scripting language and a template system can be combined for maxim flexibility and expressiveness.

The primary method of presenting configuration information to system components may advantageously be handled through a custom file system implementation. To avoid having to modify third party software packages to connect directly to a database or other data storage format, a custom file system implementation may be used to generate configuration files as the various software components would expect to see. For basic functionality, these files may be read-only.

The internal data representation of the system-wide configuration information may be presented in its own directory where each sub-module or grouping of configuration data is represented by a directory and each individual configuration element is represented by its own file. For a specific element of configuration information, such as the connection retry count for software component 'foo', this might appear to be a file such as '/config-dir/running/module/foo/network/retry-count'. Printing this file to the console should yield the text representation of the value. (i.e. the text string '5' as an example.) Writing a valid value to this file, such as the text string '3', may update the configuration information if the configuration information is permitted to be set. The conditions under which a given element of configuration information may be updated may include, but is not limited to, such things as user/role/process permissions, system status, system/databases locks, running vs. working configuration, etc. The system may include a way to specify what are valid (or at least, obviously invalid) configuration values for each element. This may be done through a scripting language or descriptive data modelling language.

The system may also parse entire files into individual configuration elements, and supporting different file formats. This functionality may allow the system to import third-party formatted configuration information in to the system-wide configuration data store. This is the compliment to the presentation system for providing configuration information to a system component in the format that component expects. This functionality would take a configuration file for that component in its native format and parse it for configuration elements that should be stored in the configuration data store. When a program writes a new copy of the configuration to the configuration file system, the new 'file' will be parsed for configuration information, and, conditions permitting, the configuration information may be updated across the system, and new configuration files may be generated for each system component. This functionality may require validation and processing of third party files. Ideally this functionality may be done in a scripting language and/or template rather than hard-coded. The system may support at least one import format to address the configuration for the entire system. (i.e. JSON or XML, as examples.) This would allow the system to be populated with an initial configuration via importing a properly formatted configuration file.

The configuration file system may support 'locking' of the 'files' within the configuration file system in order to allow third party software components to function. However, managing distinct presentation/instances of files for different software components may be managed internally.

The configuration system may include a set of policies, templates, and configuration information for itself in order to govern how configuration data is managed within the configuration system. The system configuration information may include: The models of the configuration information stored in the configuration data store. This includes such things as the labels for each configuration information element, the data type, and valid values. YANG, YIN, or a similar data modeling language might be used to describe the models. The description or the templates of the configuration files will also need to be stored, along with the mapping between the template configuration files and configuration data values. Policy configuration information will also be needed that governs access control policies for reading and writing of configuration information. Process management information will be needed so that the system understands how, if necessary, different processes on the system should be informed of configuration information changes. (i.e. via signal, pipe, restart, command, etc.)

Figure 3:
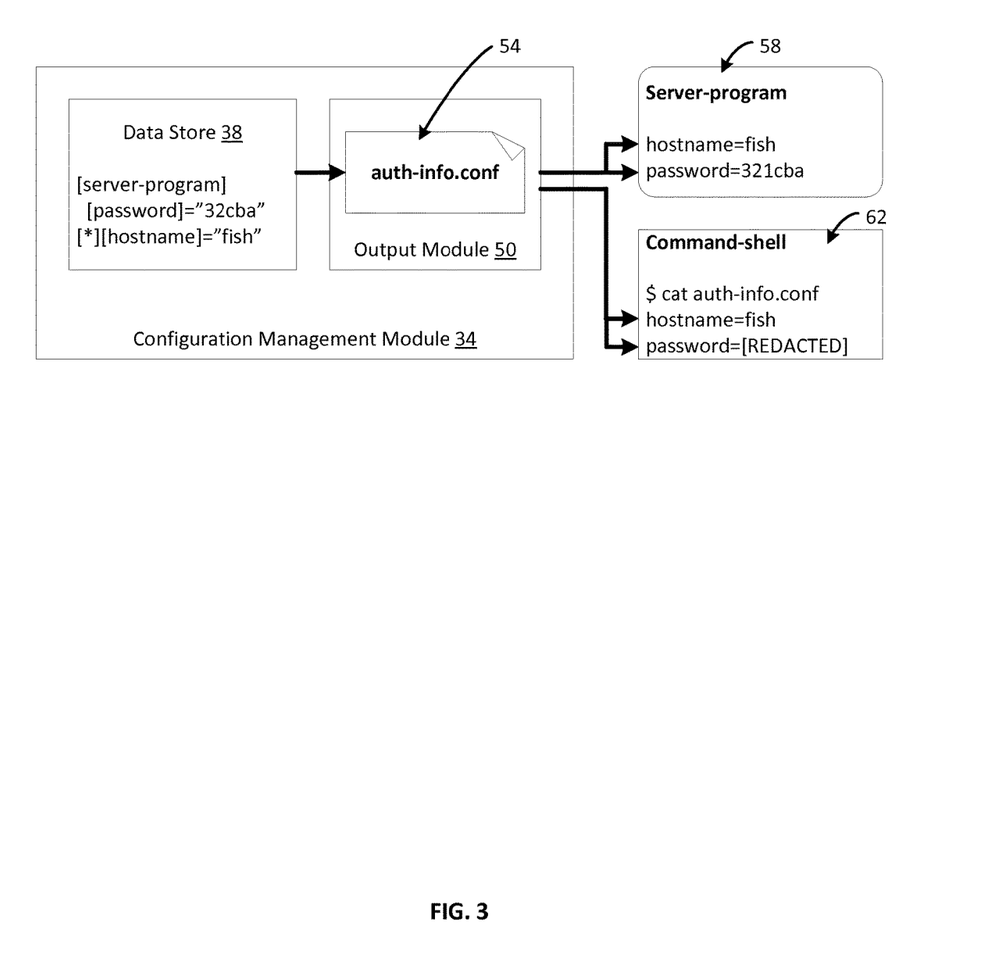

Referring now to FIG. 3, a schematic illustrating aspects of security or permissions over configuration data is shown. As has been discussed, the configuration management module 34 may provide increased control over security or permissions for individual configuration data values rather than over entire files or programs. The output module 50 may receive configuration data values from the data store 38. Using a template configuration file 54, the output module may create a configuration file 58 for a software component. As indicated at 62, access to sensitive configuration data values such as passwords may be redacted when this information is accessed. Such redaction or access may be manages according to the type of data and the access level granted to a user who is accessing the data value.

Figure 4:
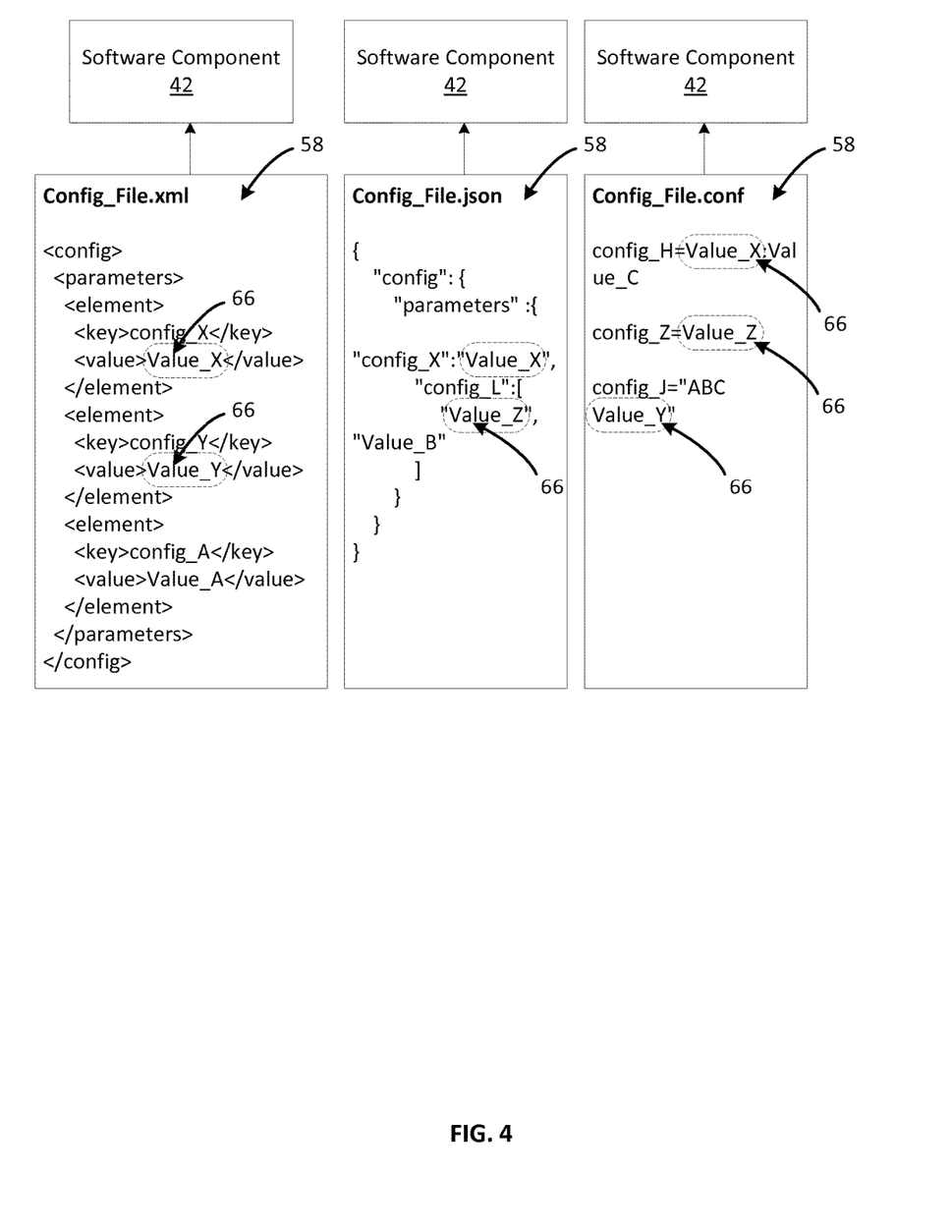

Referring now to FIG. 4, a schematic illustrating aspects of the configuration file management is shown. As has been discussed, different software components 42 on the server 22 (on the computer network 14) may each have an associated configuration file 58. Each configuration file 58 may include one or more configuration data values 66. Some configuration values 66 may be shared across multiple configuration files 58. Management of multiple configuration files can be difficult; particularly on a system where there are many software components and where multiple software components share configuration data values 66 in multiple configuration files 58. Attempts to manually update a configuration file 58 may cause software component compatibility problems where changes to one configuration file are incompatibility with another configuration file or where resulting software settings are not compatible with other software settings. Where a network system 14 is operating, continued use of the program by various client computers 18, 26 may cause problems with sequential changes to configuration settings or files. Modification of configuration information need be performed with awareness of the format and requirements of a particular configuration file and other software components and configuration files.

Figure 5:
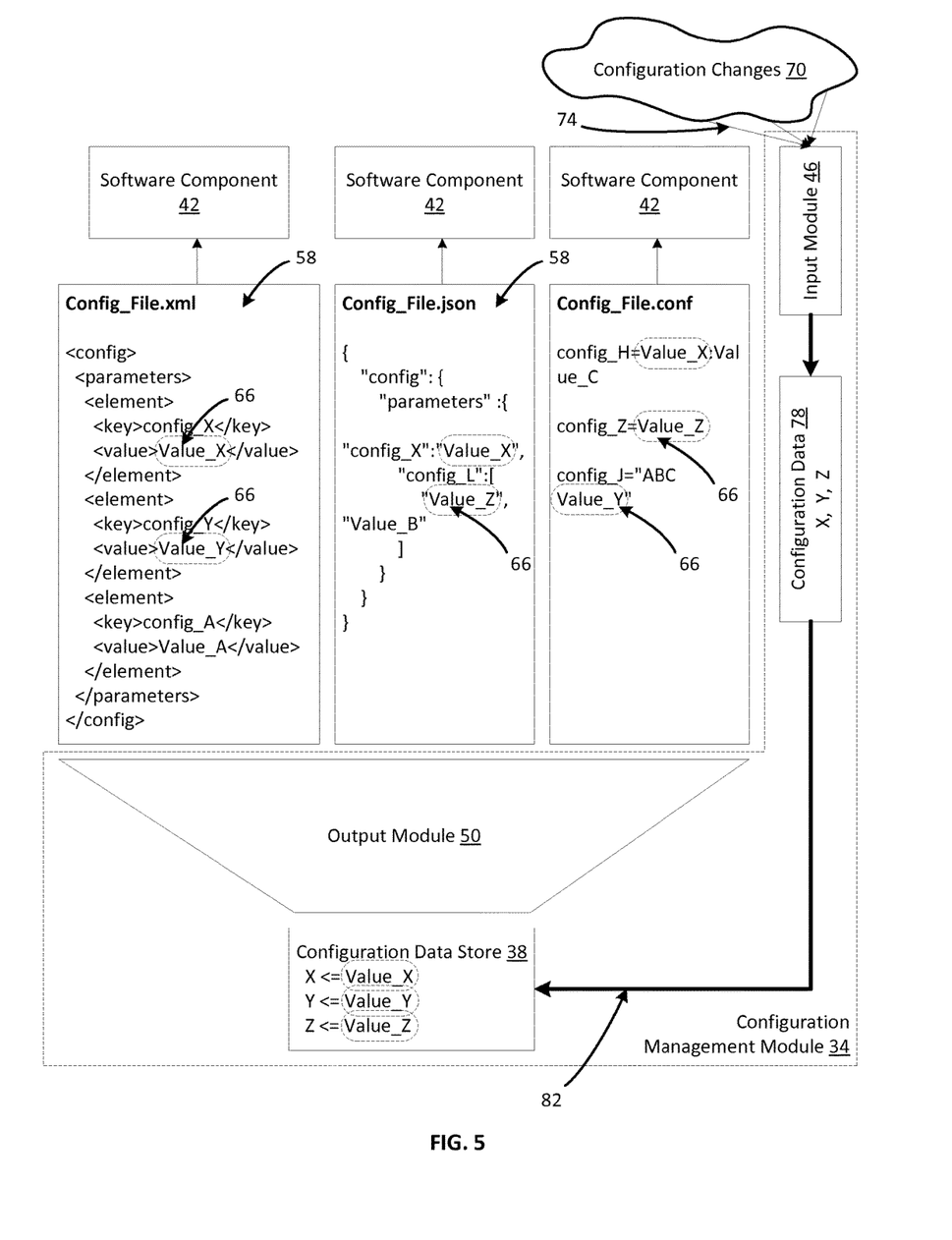

As is illustrated in FIG. 5, the configuration management system allows for easier and more reliable management of software configuration settings. A configuration management module 34 allows a user such as a systems administrator to enter configuration changes 70 (e.g. new configuration data values) via an input module 46. The input module 46 provides a user interface which manages the input of configuration data. In receiving configuration data, the configuration management module 34 (e.g. by the input module 46) may ensure that new configuration data is valid. For example, the configuration management module may analyze new configuration data and ensure that it meets requirements such as length, type of characters, etc. for the application of the configuration data. The configuration management module 34 may apply constraints to the configuration data and ensure that new data meets requirements for the end use of the configuration data (i.e. requirements imposed by the software components 42).

As is indicated at 74, configuration information 70 may be written to wrote-only files 78 which may represent individual configuration changes or a combined set of configuration changes. The configuration management system 34 may then validate the configuration information and, as indicated at 82, commit the configuration changes to the data store 38 in an atomic transaction.

The configuration management module 34 may maintain the integrity of the data store 38 while receiving new configuration data. Particularly, the configuration management module may receive new configuration data from a user, validate that the new configuration data values meet any applicable requirements, and, after all new configuration data has been received and validated, commit the new configuration data to the data store. In this manner, all new configuration data is committed to the data store 38 and partial updates or changes are not committed to the data store.

The configuration management module 34 may then use an output module 50 to provide configuration data to software components. In particular, the configuration management module may, with an output module 50, use a scripted template system to create new configuration files 58 for the various software components 42. The output module 50 may include template configuration files. The output module 50 may be scripted to retrieve configuration data values according to stored correlations between configuration data values in the data store 38 and configuration data value identifiers in template configuration files and apply the configuration data values to the template configuration files and, from the template configuration files, create and save new configuration files 58. The output module 50 may store configuration files in a location where a software component 42 is programmed to retrieve the appropriate configuration file and may overwrite an old configuration file.

Figure 6:
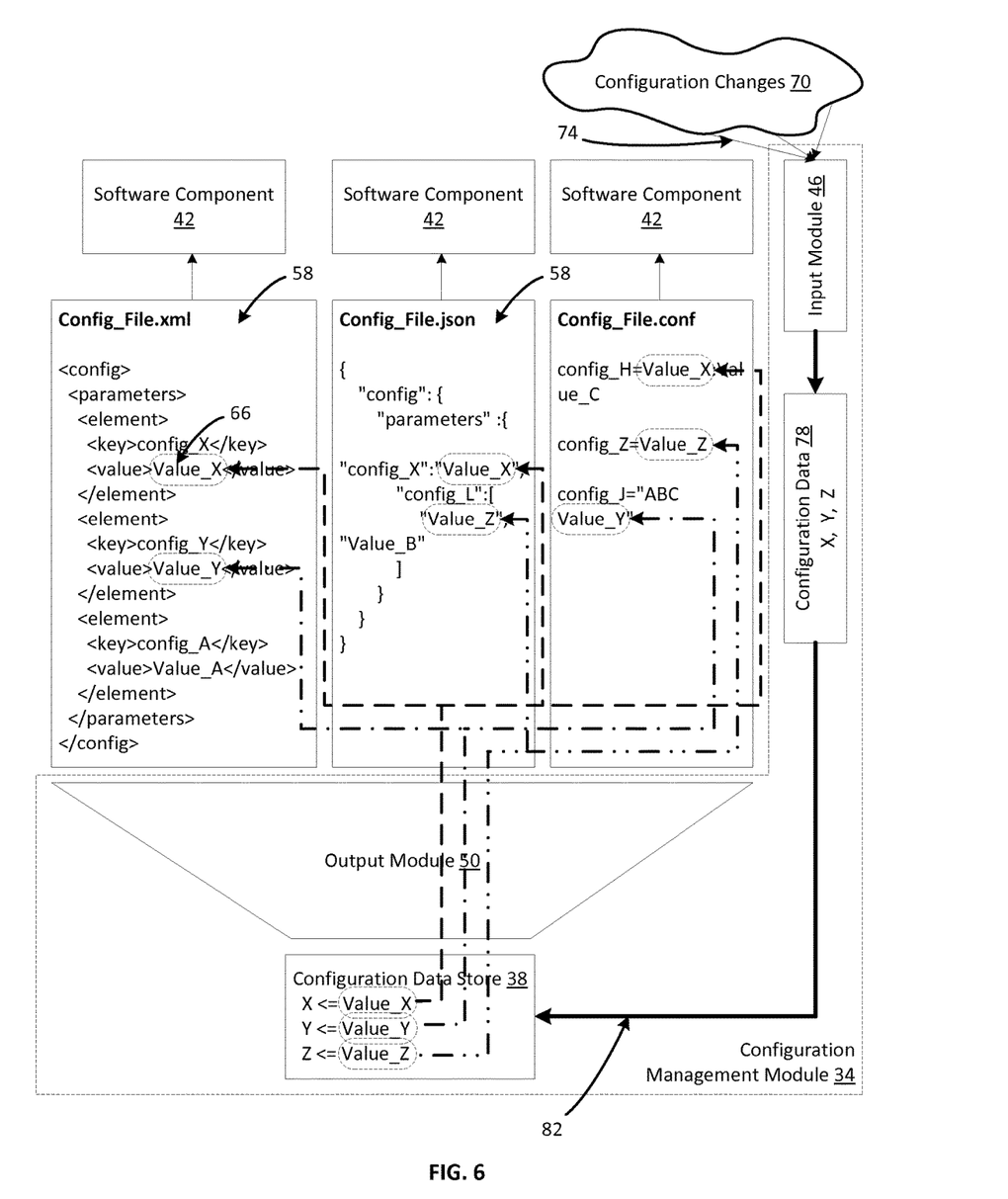

FIG. 6 illustrates how the output module 50 may create new configuration files 58 from the new configuration data values (as well as unchanged preexisting configuration data values). FIG. 6 illustrates how a change to configuration data values may cause changes to multiple configuration files 58 and how a particular configuration data value may be used in creating multiple new configuration data files. Effectively, system configuration files 58 may be simultaneously updated after changes to configuration data values are committed to the data store 38. The output module 50 may use a template system responsible for taking template configuration files for each corresponding software component 42 and populating them with the configuration data values in the data store 38. The output module may take any necessary steps to cause the software components 42 to adopt the configuration changes. For some software components, the new configuration file may be simply saved in a relevant location. For other software components, the software may need to restart and apply the configuration changes. As needed, the output module 50 may send notifications to the software components 42 to cause adoption of the configuration changes.

The configuration management system allows for near simultaneous updating of configuration settings across multiple software components on the system 14. Accordingly, one software component 42 is not reading and operating on updated configuration settings while another software component is operating on old configuration settings.

Figure 7:
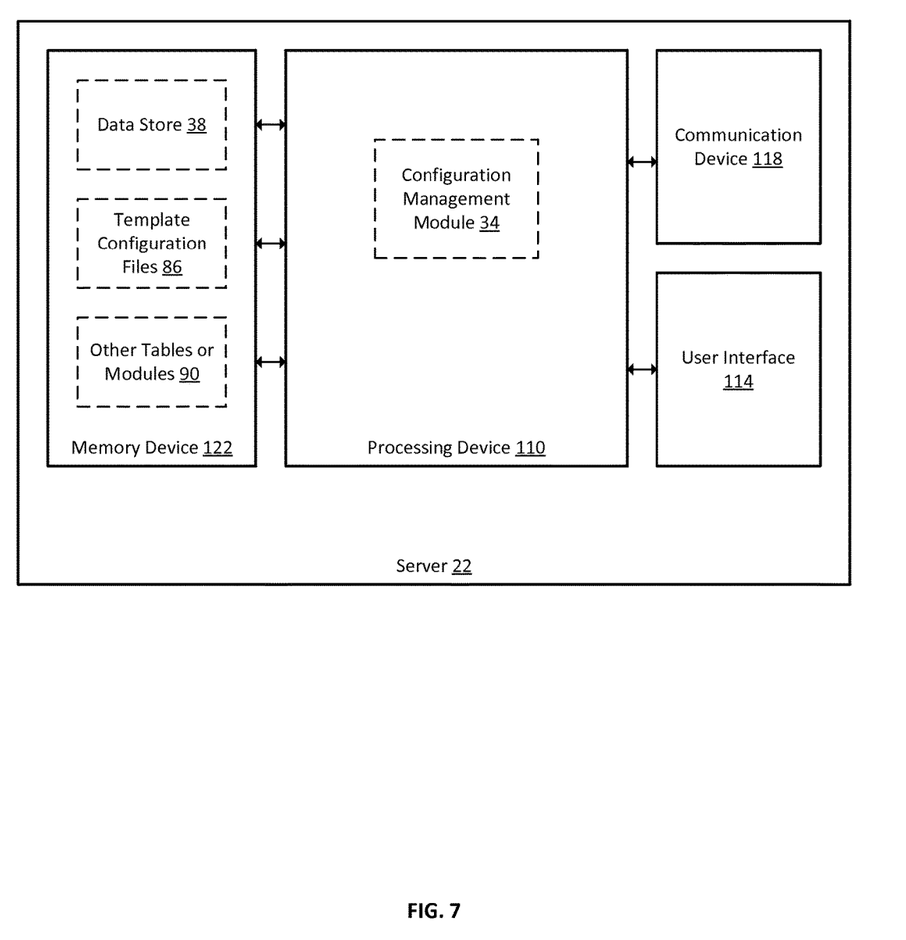
FIG. 7 is a schematic illustrating example components of a server.

Referring now to FIG. 7, a schematic illustrating example components of the server 22 is shown. In one example, the server 22 includes a processing device 110, a user interface 114, a communication device 118, and a memory device 122. It is noted that the server 22 can include other components and some of the components are not required in every example.

The processing device 110 can include memory, e.g., read only memory (ROM) and random access memory (RAM), storing processor-executable instructions and one or more processors that execute the processor-executable instructions. In embodiments where the processing device 110 includes two or more processors, the processors can operate in a parallel or distributed manner. The processing device 110 can execute the operating system of the server 22. In the illustrative example, the processing device 110 may also execute a configuration management module 34, which may be stored as programmed instructions in the memory device 122 to facilitate operation on the processing device 110.

The configuration management module 34 allows a server 22 to receive, manage, and distribute configuration data among different software components operating on the server 22 (network 14) and to perform the various tasks discussed herein.

The user interface 114 is a device that allows a user to interact with the server 22. While one user interface 114 is shown, the term "user interface" can include, but is not limited to, a touch screen, a physical keyboard, a mouse, a microphone, and/or a speaker. The communication device 118 is a device that allows the server 22 to communicate with another device; such as computers 18, 26. The communication device 118 can include one or more wireless transceivers for performing wireless communication and/or one or more communication ports for performing wired communication.

The memory device 122 is a device that stores data generated or received by the server 22 and may provide data to the processing device 110. The memory device 122 can include, but is not limited to, a hard disc drive, an optical disc drive, and/or a flash memory drive. The memory device may include various components necessary to implement the configuration management module 34 such as a data store 38, template configuration files 86, and other tables or modules 90 as are necessary to implement the various tasks and examples discussed herein.

The configuration management system discussed herein provides many advantages. For example, individual configuration elements (data values) may be broken out into their own individual files. Each file might have its own set of permissions and access controls to verify and control modification of a given element. In this manner, a user/role might be given permission to modify an individual configuration element, but the presentation that the third-party software component sees is that of the formatted configuration file containing all of the relevant configuration information. This solution allows for fine-grained access control to individual configuration elements while preserving the presentation and formatting needed for the software components. The system avoids having to need additional software which might be a source of privilege escalation security problems. Additionally, the proposed solution can implement access control policies based on the user and process attempting to read the configuration information, and only show configuration information to the allowed processes.

The configuration system provides a central configuration information management system that can support a variety of third-party software packages without requiring the software to be modified. (For example, if all of the configuration data was stored in an LDAP data store or a SQL database, then each piece of software would have to support a LDAP or SQL database interface.) Any software which can get its configuration information from a file can be supported by this system. By putting the configuration information data store 'behind' the file system, it provides a much simpler and better controlled way of updating all configuration file simultaneously. While it may be possible to have a configuration system that sits 'outside' of the file system implementation and, upon configuration changes, updates each configuration file directly. However, updating each file requires multiple individual file operations (i.e. opening, truncating, writing, and closing) and this makes it difficult to achieve a (near) simultaneous or atomic update across all configuration files. Providing transactional semantics to the configuration change (i.e. all files are updated, or none are), particularly in an atomic fashion, in this method might become problematic as it might be possible for an update on one file to fail due to disk space, file permissions, file locking issues, etc., but it might be equally possible for the rollback of another configuration to fail for the same reasons. The configuration management system hides the transactional and atomic properties of configuration updates 'behind' the file system. This allows the system to ensure that these properties are met before the final changes are published/presented as the current configuration files.

By providing access to each individual configuration element via the appearance of a unique file, such as '/config-dir/running/module/foo/network/retry-count', this facilitates the ability of shell scripts and other programs to access and potentially modify the configuration without needing to worry about parsing or formatting.

As an example without this system, if a configuration file contained "host=10.10.10.10:8080", a shell script which wanted to modify this configuration to replace the IP address without changing the port number would have to be able to scan the file for the specific line, parse the line, replace the value, format the data back into the proper format, and make the change in the file. For a shell script, this runs into several potential issues (even with this simple example):

Finding the appropriate line. While such utilities as 'grep' from a shell script are commonly used, these may have limitations. If there are multiple lines which match the pattern, for instance, searching for just "host=" might also match a line with "other_host=", but not match a line where there are spaces between 'host' and the '=', such as 'host ='. Depending on the formatting of the configuration file, using shell scripts to accurately find the exact configuration data may require extra work and complexity and may be fragile in the face of future file format changes. (i.e. supporting IPv6 addresses as well as IPv4).

Parsing the configuration value. As an example, it may be that the port number is optional, such that "host=10.10.10.10" and "host=10.10.10.10:8080" are both valid. In such a case the shell script must handle all possible cases.

Formatting the output properly. The shell script has to know what characters need to be escaped or quoted in the target file format.

Atomicity. If the shell script executes several different commands to perform the configuration change, then there is also the possibility of the file being changed by another process while the shell script is running. While there are utilities to manage file locking from shell scripts, they may not always be available or robust.

With the present system, each configuration element may be a unique file. Such that in the above example 'host' would be a directory, and would contain, as an example, a file named 'ip-address' and optionally a file named 'port'. For a shell script to change just the hostname, it would do "echo $NEW_HOSTNAME> host/ip-address". Likewise, to get the value, it could just read the file and not worry about parsing/splitting up the values. However, the 'configuration file' presented to software components would appear to contain 'host=10.10.10.10:8080'.

In trivial deployment cases, the present system might occupy more storage space than a simple set of configuration files. However, the present system is aimed at non-trivial deployment cases where there are many, perhaps dozens, of distinct, separate configuration files within a deployment that must be managed, and where ACID semantics and the ability to rollback configuration changes, or switch between multiple configuration profiles, is desired.

In such a scenario, the amount of configuration information, particularly if it is shared between software components, might end up being small compared to the boilerplate/configuration file format. For instance, XML has a reputation for being 'bloated' and excessively verbose. If one looks at, as an example '<serveraddr><ipaddr>10.10.10.10</ipaddr><port>8080</port></serveraddr>', this uses 70 bytes (not counting any optional whitespace) but the interesting and configurable data is limited to 15 bytes. Nearly 80% of the storage is boilerplate and formatting.

With the proposed system, the boilerplate and formatting could be stored as a template. Assuming the template configuration file takes roughly the same space as the original, then the template plus data adds up to a bit under 120% of the base storage. However, each additional version or rollback configuration only requires the storage for the ~20% of configuration data which actually changes. Without the proposed system, and just using multiple copies of configuration files, storing two configuration profiles would require twice the storage of one configuration. However, by the above example, the present system allows roughly five different configuration profiles to be stored in the space of two sets of complete configuration files.

The amount of benefit gained in terms of storage efficiency does depend on the several factors, such as the efficiency of the configuration file format to the actual configured data, and the number of configuration profiles to be stored. The present system will typically provide reduction in storage space in non-trivial deployments where there are many configuration files, in different formats, and several sets of configuration profiles.

The present system is particularly advantageous with regards to the robustness and consistency of the configuration data provided to software components and implemented across a server 22 and system 14. If any system failures or crashes occur, the system may restart with the last good configuration state committed to the data store 38. Upon restart, the configuration management module 34 may be programmed to automatically update or provide the configuration files 58 and the server 22 may always operate with a consistent configuration state.

The above description of illustrated examples of the present invention, including what is described in the Abstract, are not intended to be exhaustive or to be limitation to the precise forms disclosed. While specific embodiments of, and examples for, the invention are described herein for illustrative purposes, various modifications are possible without departing from the broader scope of the present invention. Indeed, it is appreciated that the specific examples are provided for explanation purposes and that other values may also be employed in other embodiments and examples in accordance with the teachings of the present invention.

What is claimed is:

1. A computer implemented method comprising:
   operating, on a server of a computer network, a first software program component, the server memory operatively coupled to a processor;
   presenting a simulated configuration file representing an actual configuration file associated with the first software component;
   receiving a first configuration data value associated with configuring the first software program component via an entry of the first configuration data value into the simulated configuration file; the server committing the configuration data value to a data store in the memory in a unique file, the data store having multiple other data values stored therein, wherein each data value is stored in a respective file having a respective set of permissions;
   receiving a request from the first software program component for a configuration update;
   upon receiving the configuration update request, accessing one of multiple configuration file templates stored separate from the data store wherein each configuration file template is formatted based on a different software program component provided by a different company, and wherein each configuration file template includes data value identifiers as respective placeholders of configuration data values;
   also upon receiving the configuration update request, accessing the data store containing the configuration data value and providing information to the first software program component from both the accessed configuration file template and the data store containing the configuration data value; and
   updating the first software program component's configuration based on both the accessed configuration file template and the data store containing the first configuration data value by executing a script to:
      identify a particular data value identifier in the accessed configuration file template;
      retrieve the first configuration data value from the data store responsive to identifying that the first configuration data value corresponds to the particular data value identifier; and
      replace the particular data value identifier of the accessed configuration file template with the first configuration data value.

2. The method of claim 1, wherein the method comprises:
   receiving a request from a second software program component for a configuration update;
   upon receiving the configuration update request, accessing a second of multiple configuration file templates wherein each configuration file template is formatted based on a different software program component;
   also upon receiving the configuration update request, accessing the data store containing the configuration data value and providing information to the second software program component from both the accessed configuration file template and the data store containing the configuration data value; and
   updating the second software program component's configuration based on both the accessed configuration file template and the data store containing the configuration data value.

3. The method of claim 2, wherein the method more specifically comprises: the server receiving a plurality of configuration data values associated with at least one of the first software component and the second software component; and the server committing the plurality of configuration values to the data store in a single transaction.

4. The method of claim 2, wherein the method more specifically comprises: the server receiving a plurality of configuration data values associated with at least one of the first software component and the second software component; and the server verifying whether the plurality of configuration data values meet requirements for associated software components; and the server committing all of the plurality of configuration values to the data store if the plurality of configuration values meet requirement for associated software components.

5. The method of claim 2, wherein the method more specifically comprises: the server receiving a plurality of configuration data values associated with at least one of the first software component and the second software component; the server verifying whether the plurality of configuration data values meet requirements for associated software components; and the server committing none of the plurality of configuration values to the data store if the plurality of configuration values do not meet requirement for associated software components.

6. A non-transitory computer-readable medium storing instructions thereon executable by a processor to:
   operate, on a server of a computer network, a first software program component, the server memory operatively coupled to a processor;
   present a simulated configuration file representing an actual configuration file associated with the first software component;
   receive a first configuration data value associated with configuring the first software program component via an entry of the first configuration data value into the simulated configuration file; the server committing the configuration data value to a particular data store file in the memory, the data store having multiple other data values stored in other data store files therein, wherein each data store file has a respective set of permissions;
   receive a request from the first software program component for a configuration update;
   upon receiving the configuration update request, access a particular configuration file template of multiple configuration file templates stored separate from the data store wherein each configuration file template is formatted based on a different software program component provided by a different company and wherein the template includes a reference identifier corresponding to the particular data store file as a placeholder of the configuration data value;
   when accessing the particular configuration file template, access the particular data store file containing the configuration data value as directed by the reference identifier and provide information to the first software program component from both the accessed configuration file template and the data store file containing the configuration data value for updating the configuration of the first software program component; and
   update the first software program component's configuration based on both the accessed configuration file template and the data store file containing the configuration data value by executing a script to:
      identify a particular data value identifier in the accessed configuration file template;
      retrieve the configuration data value from the data store file responsive to identifying that the first configuration data value corresponds to the particular data value identifier; and
      replace the reference identifier of the accessed configuration file template with the configuration data value.

7. The non-transitory computer-readable medium of claim 6, wherein the medium comprises instructions to: retrieve, via the server, a template configuration file; and the server creating a configuration file from the template configuration file.

8. The non-transitory computer-readable medium of claim 7, wherein the medium comprises instructions to: associate, via the server, multiple configuration data value reference indicators in the template configuration file with corresponding configuration data values in the data store; and the server updating the configuration of the first software component a configuration file from both the template configuration file and the configuration data values.

9. The non-transitory computer-readable medium of claim 6, wherein the medium comprises instructions to: signal the first software component to update its configuration and cause the first software component to adopt updated configuration settings from both the template configuration file and the configuration data values.

10. A computer system comprising:
    a first software component that operates on a computer network;
    a server on the computer network having a processor and memory operatively coupled to the processor;
    a configuration management module stored in the server memory, wherein the configuration management module is programmed to provide configuration data to the first software component, and wherein the configuration management module is programmed to:
       present a simulated configuration file representing an actual configuration file associated with the first software component;
       receive a first configuration data value associated with configuring the first software component via an entry of the first configuration data value into the simulated configuration file;
       commit the configuration data value to a data store in a unique file, the data store having multiple other configuration data values stored therein, wherein each configuration data value is stored in a respective file having a respective set of permissions;
    the configuration management module receiving a request from the first software program component for a configuration update;
    upon receiving the configuration update request, the configuration management module accessing one of multiple configuration file templates stored separate from the data store wherein each configuration file template is formatted based on a different software program component provided by a different company, and wherein each configuration file template includes data value identifiers as respective placeholders of configuration data values;
    also upon receiving the configuration update request, the configuration management module accessing the data store containing the configuration data value and providing information to the first software program component from both the accessed configuration file template and the data store containing the configuration data value; and
    updating the first software program component's configuration based on both the accessed configuration file template and the data store containing the first configuration data value by executing a script to:
       identify a particular data value identifier in the accessed configuration file template;

retrieve the first configuration data value from the data store responsive to identifying that the first configuration data value corresponds to the particular data value identifier; and replace the particular data value identifier of the accessed configuration file template with the first configuration data value.

11. The system of claim 10, wherein the system further comprises: a second software component operated on the computer network; and wherein the configuration management module is further programmed to: receive a first configuration data value associated with at least one of the first software component and a second software component; upon receiving the configuration update request, the configuration management module accessing a second of multiple configuration file templates wherein each configuration file template is formatted based on a different software program component;

also upon receiving the configuration update request, the configuration management module accesses the data store containing the configuration data value and providing information to the second software program component from both the accessed configuration file template and the data store containing the configuration data value; and updating the second software program component's configuration based on both the accessed configuration file template and the data store containing the configuration data value.

12. The system of claim 11, wherein the configuration management module is programmed to: receive a plurality of configuration data values associated with at least one of the first software component and the second software component; and commit the plurality of configuration values to the data store in a single transaction.

13. The system of claim 11, wherein the configuration management module is programmed to: receive a plurality of configuration data values associated with at least one of the first software component and the second software component; and verify whether the plurality of configuration data values meet requirements for associated software components; and commit all of the plurality of configuration values to the data store if the plurality of configuration values meet requirement for associated software components.

14. The system of claim 11, wherein the configuration management module is programmed to: receive a plurality of configuration data values associated with at least one of the first software component and the second software component; verify whether the plurality of configuration data values meet requirements for associated software components; and commit none of the plurality of configuration values to the data store if the plurality of configuration values do not meet requirement for associated software components.

15. The system of claim 10, wherein the configuration management module is programmed to: receive the configuration data value independent of a configuration file associated with the first software component.

16. The system of claim 10, wherein the configuration management module is programmed to: store individual configuration data values in respective individual files in a directory tree.

17. The system of claim 10, further comprising wherein the multiple configuration file templates are each formatted based on a proper file format and data format of a particular software program component.

18. The system of claim 17, wherein the configuration management module is programmed to: associate configuration data value indicators in the template configuration file with configuration data values in the data store; and update the first software program component's configuration based on both the accessed configuration file template and the data store containing the configuration data value.

19. The system of claim 10, wherein the configuration management module is programmed to: signal the first software component to update its configuration and cause the first software component to adopt updated configuration settings from both the template configuration file and the configuration data values.

* * * * *